J. M. STUCKER.
AUTOMATIC POWER JACK FOR AUTOMOBILES.
APPLICATION FILED OCT. 18, 1913.
1,131,747.
Patented Mar. 16, 1915.
3 SHEETS—SHEET 2.
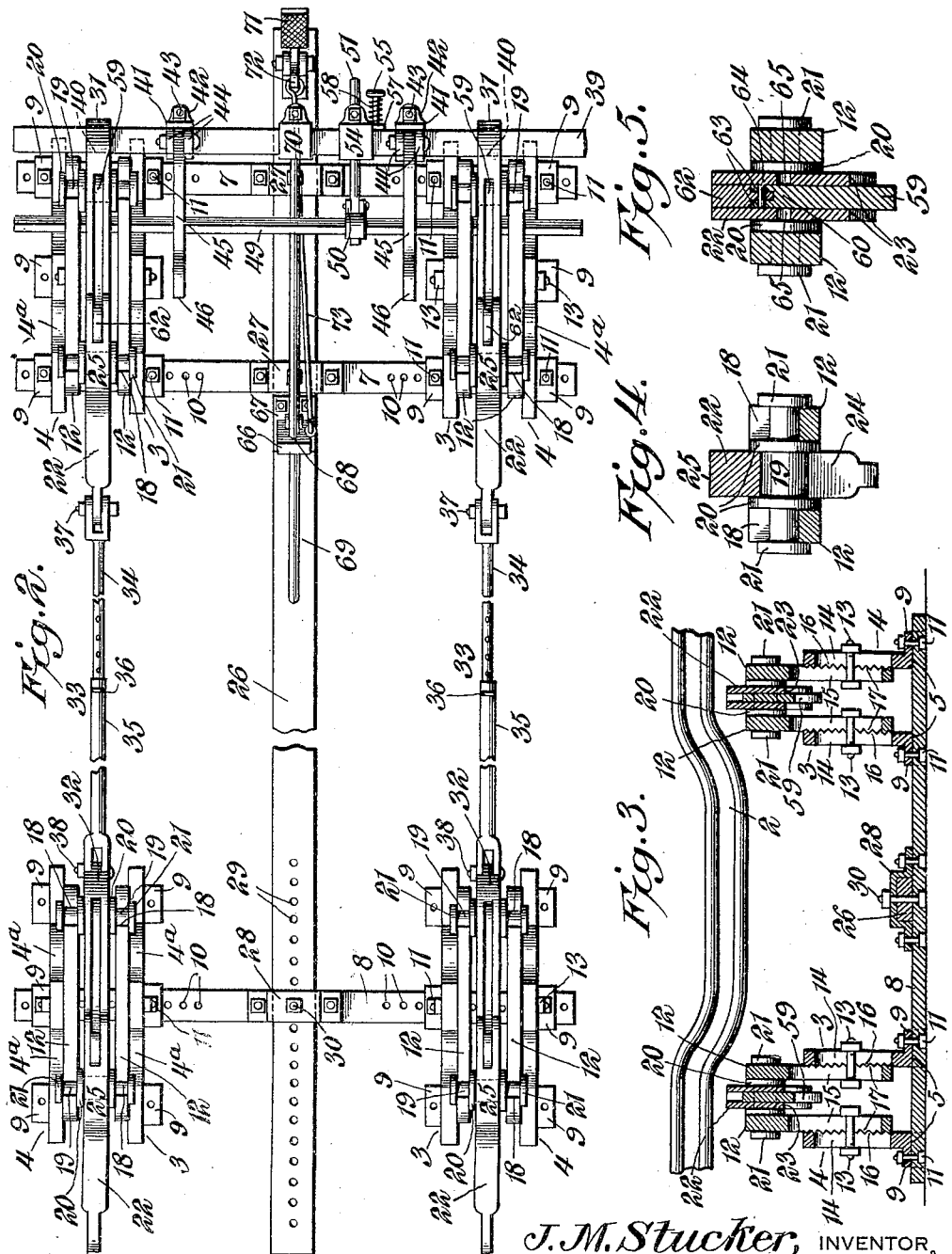
J. M. Stucker, INVENTOR,
WITNESSES
BY
ATTORNEY

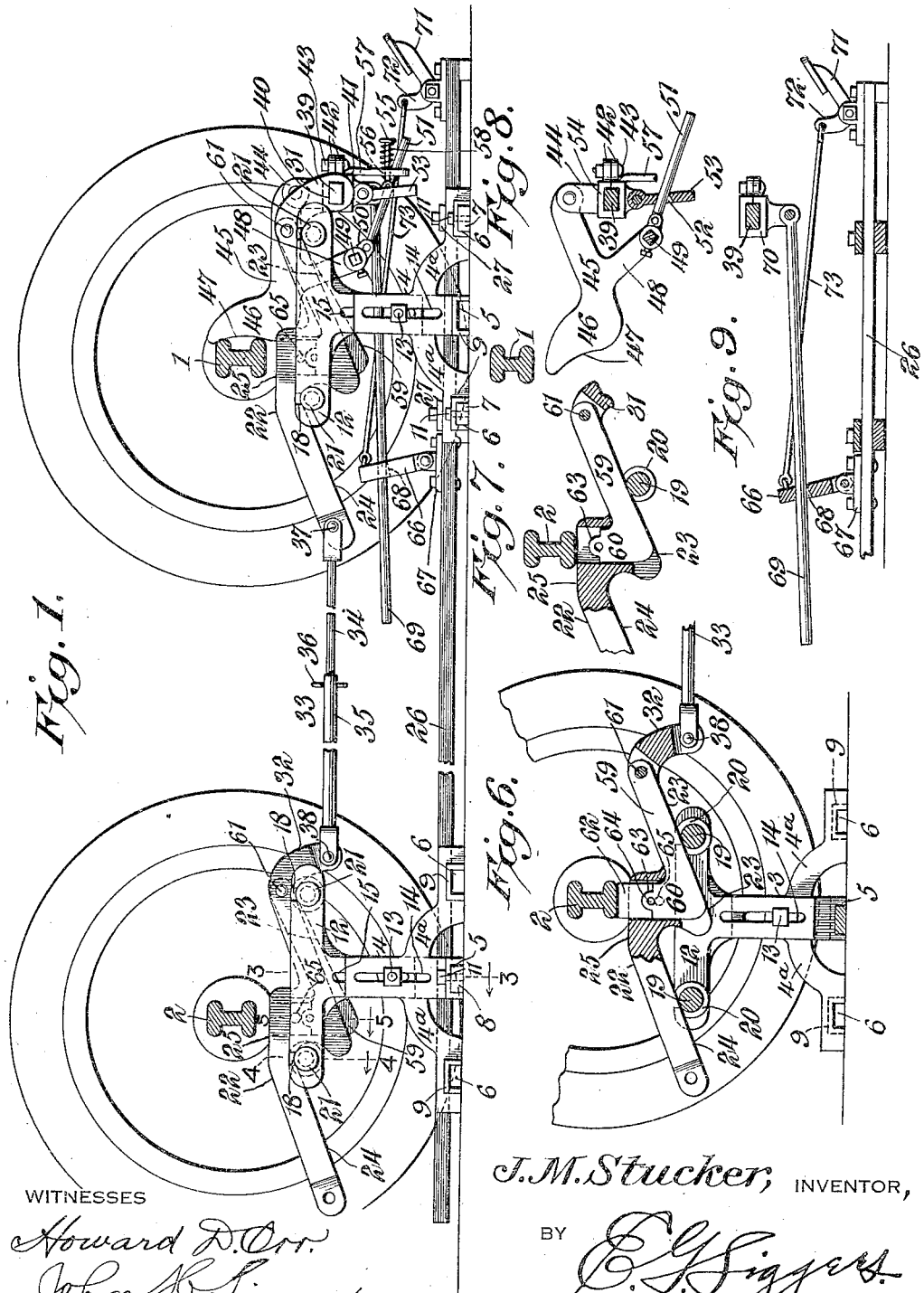

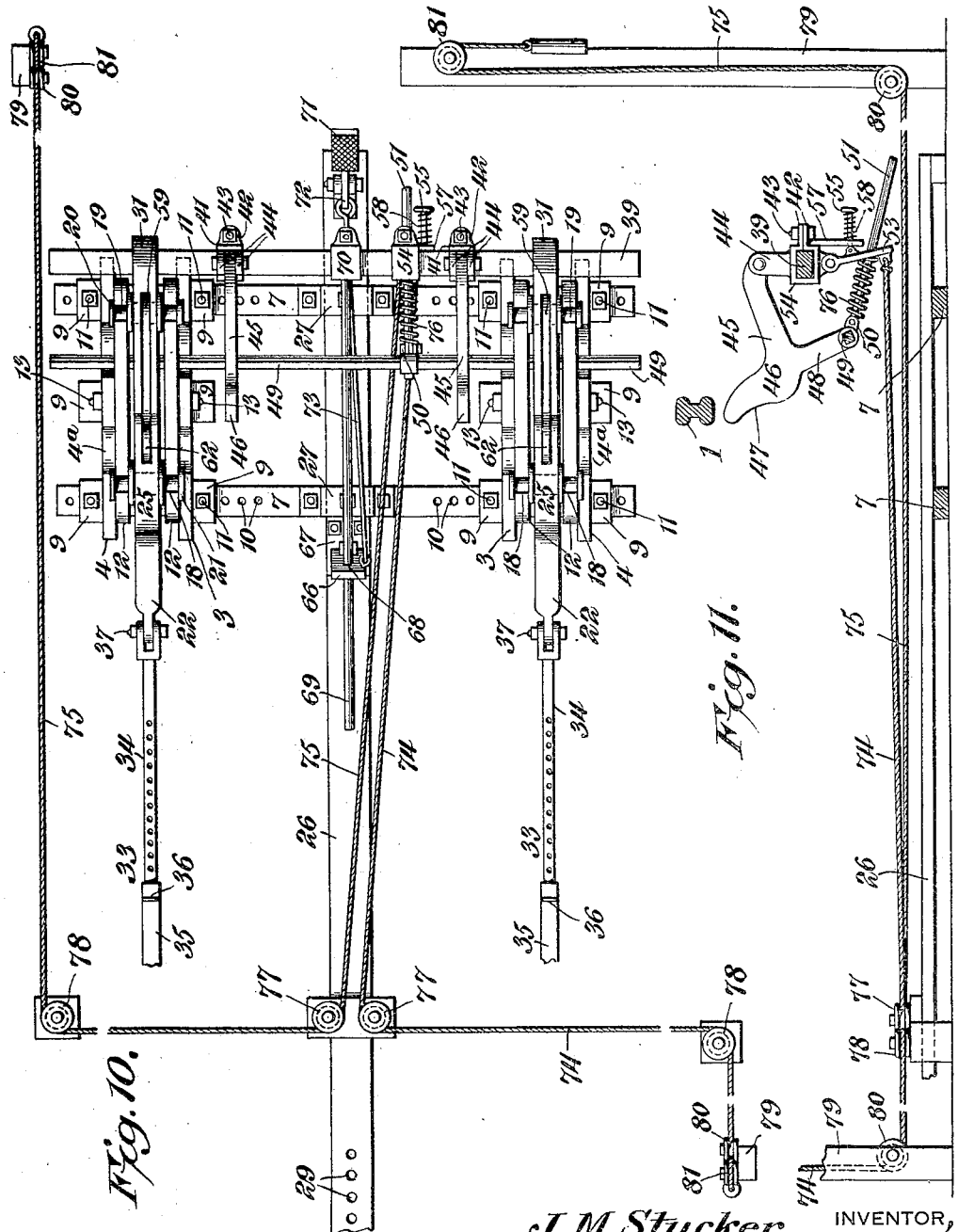

UNITED STATES PATENT OFFICE.

JOHN M. STUCKER, OF OTTAWA, KANSAS.

AUTOMATIC POWER-JACK FOR AUTOMOBILES.

1,131,747.     Specification of Letters Patent.     Patented Mar. 16, 1915.

Application filed October 18, 1913. Serial No. 795,962.

*To all whom it may concern:*

Be it known that I, JOHN M. STUCKER, a citizen of the United States, residing at Ottawa, in the county of Franklin and State of Kansas, have invented a new and useful Automatic Power-Jack for Automobiles, of which the following is a specification.

The invention relates to improvements in automatic jacks for automobiles.

The object of the present invention is to improve the construction of automatic jacks for automobiles, and to provide a simple, practical and comparatively inexpensive automobile jack of strong and durable construction, adapted to be operated by the momentum of an automobile, and capable of lifting the same clear of the floor of a garage or other supporting surface to relieve the pneumatic tires of pressure while the machine is idle, and to facilitate repairs.

A further object of the invention is to provide an automobile jack of this character equipped with auxiliary supporting means adapted to elevate an automobile sufficiently to support any hanging parts clear of the main supporting device to prevent injury to the said parts.

With these and other objects in view, the invention consists in the construction and novel combination of parts hereinafter fully described, illustrated in the accompanying drawings, and pointed out in the claims hereto appended; it being understood that various changes in the form, proportion, size and minor details of construction, within the scope of the claims, may be resorted to without departing from the spirit or sacrificing any of the advantages of the invention.

In the drawings:—Figure 1 is a side elevation of an automatic automobile jack, constructed in accordance with this invention, the front and rear axles of an automobile being shown in section in position to be elevated. Fig. 2 is a plan view of the same, the axles being omitted. Fig. 3 is a transverse sectional view on the line 3—3 of Fig. 1. Fig. 4 is a detail sectional view on the line 4—4 of Fig. 1. Fig. 5 is a similar view on the line 5—5 of Fig. 1. Fig. 6 is a longitudinal sectional view of one of the rear jacks, showing an axle supported by the supplemental lifting device. Fig. 7 is a similar view showing the axle resting directly upon the jack bar. Fig. 8 is a detail sectional view, showing the push bar arranged below the plane of the axle. Fig. 9 is a detail sectional view, illustrating the construction of the clutch for locking the automobile jack in an elevated position. Fig. 10 is an enlarged plan view of a portion of the automatic power jack equipped with manually operable means for elevating the push bars or members. Fig. 11 is a longitudinal sectional view of the same.

Like numerals of reference designate corresponding parts in all the figures of the drawings.

In the accompanying drawings in which is illustrated the preferred embodiment of the invention, the automatic power jack for automobiles comprises in its construction four simultaneously operated jacks arranged in pairs at the front and rear of the apparatus, and adapted to receive the front and rear axles 1 and 2 of an automobile, as clearly illustrated in Fig. 1 of the drawings. Each jack comprises in its construction spaced inner and outer vertical standards 3 and 4 preferably consisting of castings and having front and rear bracing legs 4$^a$ and provided with recesses 5 and 6 located at the lower ends of the body portions of the standards and at the lower terminals of the bracing legs 4$^a$ and adapted to receive front and rear connecting bars 7 and 8. The lower ends of the standards and the legs constitute base portions which are adapted to be arranged upon the floor of a garage or other supporting surface. The standards are provided at the recesses 5 and 6 with flanges 9, which are bolted or otherwise secured to the transverse bars 7 and 8. A pair of transverse connecting bars is arranged at the front of the apparatus and the rear jacks, which support the rear axle are connected by the single central transverse bar 8, the standards being preferably constructed with the central and side recesses 5 and 6 to enable them to be arranged either at the front or back of the apparatus, but they may be constructed to receive only the desired transverse connecting bar or bars. The transverse connecting bars are provided at their terminal portions with perforations 10, arranged at intervals and adapted to receive the bolts 11 of the attaching flanges 9 to enable the pairs of jacks to be spaced apart the desired distance to suit the width of different automobiles. The standards are equipped with vertically adjustable bearings consisting of approximately T-shaped sections 12, fitted against the inner faces of the standards and secured to the same by bolts 13, operating in vertical slots 14 and 15 of the standards and the bearings. The bolts and slots permit the jacks to be adjusted vertically to suit the diameter of wheels of different automobiles and the corresponding height of the axles, and in order to prevent the vertically adjustable sections or bearings from slipping, the standards and the sections or bearings are provided with interlocking teeth 16 and 17 at their contiguous faces, as clearly shown in Fig. 3. The T-shaped bearing sections of the standards are spaced apart and their arms extend forwardly and rearwardly and are provided at the terminal portions with transversely alined bearing recesses 18 receiving reduced portions of the transverse antifriction rollers 19 having inner and outer flanges 20 and 21 arranged at the inner and outer faces of the adjustable bearing sections. Any other form of bearing recess may of course be employed and the inner flanges of the antifriction rollers form grooves for the reception of longitudinally slidable jack bars 22, having parallel front and rear inclined edges 23 and 24 arranged upon and supported by the front and rear rollers 19. Each jack bar preferably consists of inclined front and rear portions and in an intermediate enlarged connecting portion, the inclined portions forming the inclined edges 23 and 24, and the enlarged intermediate portion having an upper horizontal axle supporting edge 25, but the essential features of the jack bars are the inclined front and rear edges and the horizontal supporting edge and the form of jack bar may be varied without affecting such edges. When the jack bar is moved forwardly, the inclined lower edges 23 and 24 ride up the antifriction rollers and elevate the jack bars and the rearward movement of the jack bar lowers the same.

The apparatus is adjustable longitudinally to vary its effective length for arranging the supporting portions of the jack bars in position to receive the axles of an automobile by means of a central connecting or reach bar 26, secured at its front portion in loops or keepers 27 of the front transverse bars 7 and adjustably connected with a similar loop or keeper 28 of the rear transverse connecting bar 8. The rear portion of the reach or connecting bar 26 is provided at intervals with perforations 29 to receive a bolt 30, or other suitable fastening device, which passes through the loop or keeper 28, the connecting bar 26 and the transverse bar 8. By placing the bolt 30 in the different perforations of the central connecting bar, the rear jacks may be adjusted backwardly or forwardly as desired.

The jack bars are provided at their front ends with depending arms 31 and 32, and the arms 32 of the rear jack bars are connected with the rear ends of the front jack bars by side connecting rods 33, composed of telescoping sections 34 and 35 adjustably secured together by a pin or key 36 passing through registering perforations of the sections for varying the effective length of the connecting rods. The connecting rods are adapted to be adjusted with the longitudinal adjustment of the apparatus, and they insure a simultaneous operation of the jack bars. The ends of the connecting rods are preferably bifurcated to receive the adjacent terminal portions of the front and rear jack bars, and they are pivoted to the same by transverse bolts 37 and 38 or other suitable fastening devices.

The front arms 31 of the front jack bars are connected by a transverse bar 39 arranged in openings 40 of the front depending arms 31, and equipped with opposite sleeves 41, split at the front portion and having horizontally projecting ears 42, which are connected by bolts 43 adapted to clamp the sleeves on the transverse connecting bar 39. The sleeves 41 are provided with upwardly extending ears 44 to which are pivoted push bars or members 45 connected at their front ends to the said sleeves and provided with enlarged upwardly extending rear portions 46 forming abutments and adapted to be engaged by the front axle 1 of an automobile, which is run over the device astride of the same at a slow speed with just enough momentum to operate the apparatus. The enlarged abutment portions 46 of the push bars or members are provided with rear recesses 47, forming overhanging portions and adapted to prevent the front axle from slipping out of engagement with the push bars. The abutments of the push bars are located in the transverse plane of the front portions of the horizontal supporting edges 25 of the front jack bars, so that the front axle when in engagement with the push bars or members is in position to be supported by the front jack bars.

The front push bars are provided at an intermediate point with depending arms 48, which are connected by a transverse rod 49 having a centrally arranged arm 50, in a bifurcation of which is pivoted a clutch rod 51. The rod 49 is preferably square and arranged in rectangular openings of the arms 48, but it may be rigidly connected with the push bars in any other suitable manner. The clutch rod 51 extends through a tapered opening 52 of a pendant clutch 53 pivotally hung from a sleeve 54, constructed similar to the sleeves 41. The clutch 53, which is adapted to grip the clutch rod 51 between its upper wall and lower edge, as illustrated in Fig. 8 of the drawings, supports the push bars or members in an elevated position, and it is adapted to be swung rearwardly by a push rod 55, pivotally connected to the clutch 53 and extending through an opening 56 of a depending lug or flange 57 of the sleeve 54. The rod is provided at its front or outer end with a head and is maintained in an extended position by a coiled spring 58 interposed between the head of the rod and the flange 57. When the rod 55 is pushed inwardly or rearwardly, the clutch releases the clutch rod 51 and will permit the push members to drop to the position shown in Fig. 8, to permit an automobile to pass over the apparatus without operating the same.

Each jack bar is equipped with a supplemental lifting member 59, mounted in a longitudinal slot in the front and central portions of the jack bar and consisting of an inclined portion and a rear upwardly extending arm 60. The supplemental lifting member 59, which has an inclined lower edge corresponding to the front inclined edges 23 of the jack bar is connected with the same by a pivot 61, and its rear supporting arm is provided with a removable upper section 62, adapted to be detached when the supplemental lifting member is not desired. The upper section is connected with the lower section by a joint consisting of registering ears 63 projecting from straight edges of the sections of the arm and connected by a removable pin 64 adapted to be taken out through a transverse perforation 65 of the jack bar. The perforation 65 is located at a point intermediate of the limits of the upward and downward movements of the supplemental lifting device so that when the supplemental lifting device is at its raised or lowered position, the connecting pin of the joint will not register with the perforation or opening of the jack bar. When it is desired to remove the upper section of the arm of the supplemental lifting device, the latter is raised a sufficient distance to bring the pin into register with the said perforation 65. The supplemental lifting devices are adapted to project above the supporting edges of the jack bars, as illustrated in Fig. 6 of the drawings, to support either or both of the axles of an automobile in a superimposed position with relation to the supporting edges 25, so that any hanging parts extending below the axles of an automobile will be maintained clear of the jack bars and will be prevented from resting upon the same and being bent or otherwise injured thereby.

The jack bars are locked in an elevated position by means of a clutch 66 pivotally mounted on a base plate 67 and having a tapered opening 68 receiving a clutch rod 69, which is pivoted to a central sleeve 70. The sleeve 70, which is constructed similar to the sleeves 41, is adjustably clamped to the transverse bar 39, and the base plate 67, which is preferably in the form of a casting, is bolted or otherwise secured to the central longitudinal connecting or reach bar. The clutch 66, which is adapted to swing longitudinally of the apparatus, has the upper wall and lower edge of its opening 68 maintained in gripping engagement with the clutch rod 69 by the pressure incident to the weight of the automobile and the clutch bar, and when it is desired to lower an automobile to the floor or other supporting surface, the clutch 66 is swung forwardly by a foot lever 71, pivotally mounted on the reach or connecting bar 26 at the front end thereof and provided with an arm 72, which is connected by a rod 73, with the upper end of the clutch 66. By depressing the foot lever, a supported automobile may be lowered slowly and gently to the floor.

When the push bars or members 46 are in their lowered position, as illustrated in Fig. 8 of the drawings, they are located below the plane of the axles of an automobile and the latter may be run over the jack without operating the same. When the automobile has passed over the jack and its rear axle is located in advance or beyond the push bars, the pendent clutch 53 may be released by a wire 74 or 75 or other suitable means connected with the clutch 53 and designed to extend to a suitable point outside of a garage in order to enable the chauffeur of a car to reach out from his seat and pull the clutch operating wire 74 or 75. These connections 74 and 75 are designed to be arranged to enable the clutch 53 to be operated either in front or in rear of the jack while the operator is in the seat of an automobile. When the pendent clutch 53 is swung forwardly against the action of the spring 58 it permits a spring 76 to slide the rod 51 through the opening 52 in the clutch 53 and move the push bars or members upwardly into their engaging position in the path of the front axle of an automobile that may be subsequently driven over the jack so that the latter will be operated by such automobile. The flexible connections or wires 74, 75 extend from the clutch 53 in a direction longitudinally of the automatic jack to spaced inner guide pulleys 77 and they extend therefrom transversely of the jack to outer pulleys 78. From the outer guide pulleys 78 the flexible connections extend to posts 79 arranged at suitable points and equipped with lower and upper guide pulleys 80 and 81. The upper guide pulleys support the terminal portions of the wires 74 and 75 at a proper elevation so that the said wires will be within easy reach of a chauffeur occupying the seat of the automobile.

In practice the rear jacks will preferably be equipped with guides located on a line with the floor and in such position that the front wheels of the on-coming automobile will not strike the jacks should the device not be properly positioned but will strike the guide and deflect the device to one side or the other and thus properly position the same. These guides are in the form of frogs and extend just past the forward and inside ends of the back jacks so as to go between the front wheels of the automobile evenly on each side, the rear wheels following in line therewith.

One of the salient features of the push bar or member is to operate the apparatus after the automobile has passed over the front jacks, and to actuate the bars or members, while the operator is in the car, and also to leave the push bars or members in a position ready to receive the next on-coming automobile. Another salient feature of the invention is the supplemental lifting bar or member, which normally projects below the jack bar, and receives a preliminary or initial upward movement.

What is claimed is:—

1. A device of the class described including front and rear jacks arranged in pairs and comprising standards having base portions provided with transverse recesses and adapted to be arranged upon a floor or other supporting surface, and sliding jack bars having axle receiving means, front and rear transverse bars secured in the said recesses and adjustably connecting the said jacks to vary the width of the device, a longitudinal reach bar adjustably connecting said transverse bars to vary the length of the device, and means connected with the jack bars for simultaneously operating the same to elevate an automobile, said means being also adjustable to correspond with the adjustment of the reach bar.

2. A device of the class described including front and rear jacks arranged in pairs and comprising standards having base portions adapted to be arranged upon a floor or other supporting surface, and slidable jack bars provided with a plurality of spaced inclined edges and slidable longitudinally on the said edges, said jack bars being provided with axle receiving means located between the said inclined edges, and means connected with the jack bars for operating the same.

3. A device of the class described comprising front and rear jacks arranged in pairs, each including a jack bar having a plurality of lower inclined edges and slidable longitudinally on the said edges, means for connecting the jack bars for causing the same to move in unison, and means connected with the jack bars and arranged to be actuated by an automobile, whereby the latter is adapted to operate the device.

4. A device of the class described comprising front and rear jacks arranged in pairs, each including spaced standards having front and rear supporting rollers, and a jack bar slidable longitudinally and having lower inclined edges arranged upon the said rollers, and means for connecting the jack bars and for moving the same in unison.

5. A device of the class described comprising front and rear jacks arranged in pairs, each including spaced standards provided with adjustable bearing sections interlocked with the standards, transverse rollers connecting the bearing sections, and a slidable jack bar having inclined edges supported by the said rollers, means for connecting the jack bars, and means for moving the same in unison.

6. A device of the class described comprising front and rear jacks arranged in pairs, spaced standards having vertical slots and provided with teeth, bearing sections also provided with vertical slots and having teeth to engage those of the standards, fastening means operating in the slots for securing the bearing sections in their adjustment, rollers carried by the bearing sections, and jack bars having inclined edges slidably arranged on the rollers, and means for connecting the jack bars for causing the same to move in unison.

7. A device of the class described comprising front and rear jacks arranged in pairs, each including longitudinally slidable jack bars having inclined edges, means for connecting the jack bars for causing the same to move in unison, and locking means consisting of a clutch rod connected with the jack bars, and a clutch arranged to grip the clutch rod to hold the same against movement in one direction and adapted to permit movement of the clutch rod in the opposite direction.

8. A device of the class described including front and rear jacks arranged in pairs, each including longitudinally slidable jack bars having inclined edges, means for connecting the jack bars for causing the same to move in unison, a clutch rod connected with the said means, a pivotally mounted clutch coacting with the rod and arranged to lock the same against movement in one direction and adapted to permit movement of the same in the opposite direction, and a foot lever connected with the clutch.

9. A device of the class described comprising front and rear jacks arranged in pairs, each including longitudinally slidable jack bars having inclined edges, means for connecting the jack bars for causing the same to move in unison, a clutch rod connected with the said means, a pivotally mounted clutch having a tapered opening receiving the rod, said clutch being adapted to grip and lock the rod against movement in one direction and permitting movement of the rod in the opposite direction, and an operating device connected with the clutch and adapted to oscillate the same to release the clutch rod.

10. A device of the class described including front and rear jacks arranged in pairs and comprising standards having base portions adapted to be arranged upon a floor or other supporting surface, slidable jack bars having a plurality of spaced lower inclined edges slidable on the standards, said jack bars being also provided between the said inclined edges with axle receiving means, and means for sliding the jack bars.

11. A device of the class described including front and rear jacks arranged in pairs and having slidable jack bars, means for connecting the front and rear jack bars, a push bar or member pivotally connected with the front jack bar and movable upwardly and downwardly to arrange it in the path of an automobile and to drop it below the same, and means for supporting the push bar or member in an elevated position.

12. A device of the class described including front and rear jacks arranged in pairs and having slidable jack bars, means for connecting the front and rear jack bars, a push bar or member connected at its front portion with the front jack bar and having an enlarged rear abutment portion adapted to be engaged by an automobile.

13. A device of the class described including front and rear jacks arranged in pairs and having slidable jack bars, means for connecting the front and rear jack bars, spaced push bars or members connected with the front jack bars and having depending arms, a transverse rod connecting the arms, a clutch rod connected with the transverse rod, and a clutch arranged to engage the clutch rod for supporting the push bars in an elevated position.

14. A device of the class described including spaced jacks having slidable jack bars, a transverse bar connecting the jack bars, a push bar pivotally mounted on the transverse connecting bar and having an abutment portion adapted to be engaged by an automobile, a pivotally mounted clutch having a tapered opening and carried by the transverse bar, and a clutch rod connected with the push bar and operating in the opening of the clutch and adapted to be engaged by the latter for supporting the push bar in the path of an automobile.

15. A device of the class described including spaced jacks having slidable jack bars, a transverse bar connecting the jack bars, a push bar pivotally mounted on the transverse connecting bar and having an abutment portion adapted to be engaged by an automobile, a pivotally mounted clutch carried by the transverse bar and coacting with a clutch rod for supporting the push bar in an elevated position, and a spring actuated operating rod connected with the clutch and maintaining the latter normally in its engaging position.

16. A device of the class described including a jack having a slidable jack bar provided with an inclined edge, and a supplemental lifting member carried by the jack bar and provided with an inclined edge and arranged to be engaged prior to the slidable jack bar, said supplemental lifting member having means extending above the jack bar for supporting the axle of an automobile in a superimposed position.

17. A device of the class described including a longitudinally slidable jack bar having spaced front and rear inclined edges and slidable thereon, and a supplemental lifting member pivotally mounted on the jack bar and having a lower inclined edge and provided with a portion projecting above the jack bar to support an axle in an elevated position, said portion being removable to permit the axle to rest upon the jack bar.

18. A device of the class described including a longitudinally slidable jack bar having front and rear inclined edges and provided with a longitudinal slot, a superimposed lifting member pivotally mounted in the slot and having a lower inclined edge normally projecting below the jack bar, said lifting member being provided with an upwardly extending portion arranged to project above the jack bar to support an automobile in a superimposed position with relation to the jack bar.

19. A device of the class described including a jack having a slidable jack bar provided with front and rear inclined portions and an intermediate enlarged portion, said jack bar being also provided with a longitudinal opening, and a pivotally mounted supplemental lifting bar having an inclined lower edge and normally depending below the jack bar, said lifting bar being also provided with an arm operating in the enlarged portion of the jack bar and adapted to project above the same.

20. A device of the class described, including front and rear jacks arranged in pairs and having sliding bars, means for connecting front and rear bars, a push bar or member pivotally connected with the front bar and movable downwardly below the path of an automobile, permitting the same to pass forward and over the front and rear jacks, and means for supporting the push bars or members in a downward position.

21. A device of the class described including front and rear jacks arranged in pairs and having sliding jack bars, means for connecting the front and rear jack bars, a push bar or member connected at its front portion with the front jack bars, means for releasing the push bars, or members, when downward after the rear of the automobile has proceeded over the rear and front jack bars, and means for supporting the push bars or members in an elevated position.

22. A device of the class described including front and rear jacks arranged in pairs and having sliding jack bars, means for connecting the front and rear jack bars, a push bar or member pivotally connected at its front to the jack bar, movable downwardly below the path of an automobile, and means for raising or lowering the push bars or members while the operator is in the seat of the automobile in advance of or in the rear of the jack bars.

In testimony, that I claim the foregoing as my own, I have hereto affixed my signature in the presence of two witnesses.

JOHN M. STUCKER.

Witnesses:
JULIA B. JAMES,
CHAS. B. SHINN.

Copies of this patent may be obtained for five cents each, by addressing the "Commissioner of Patents, Washington, D. C."